United States Patent
Lerner et al.

(10) Patent No.: US 11,880,858 B2
(45) Date of Patent: Jan. 23, 2024

(54) SYSTEMS AND METHODS TO PREDICT RENTAL VEHICLE PREFERENCE OF A CUSTOMER

(71) Applicant: Ford Global Technologies, LLC, Dearborn, MI (US)

(72) Inventors: Jeremy Lerner, Southfield, MI (US); Paige Wong, Ann Arbor, MI (US); Scott Huggins, Novi, MI (US); Xingping Chen, Troy, MI (US); Taylor Hawley, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 17/321,575

(22) Filed: May 17, 2021

(65) Prior Publication Data
US 2022/0366445 A1   Nov. 17, 2022

(51) Int. Cl.
*G06Q 30/0207*    (2023.01)
*G06Q 30/0202*    (2023.01)
(Continued)

(52) U.S. Cl.
CPC .......... *G06Q 30/0224* (2013.01); *G06N 5/04* (2013.01); *G06Q 10/06315* (2013.01);
(Continued)

(58) Field of Classification Search
None
See application file for complete search history.

(56) References Cited

U.S. PATENT DOCUMENTS

| | | | |
|---|---|---|---|
| 2015/0105976 A1* | 4/2015 | Shikii | B60K 28/04 |
| | | | 701/36 |
| 2016/0046300 A1* | 2/2016 | Wingfield | G01C 21/3438 |
| | | | 701/48 |

(Continued)

FOREIGN PATENT DOCUMENTS

| | | | |
|---|---|---|---|
| CN | 101620781 A | | 1/2010 |
| CN | 109816206 A | * | 5/2019 |
| KR | 20200001841 A | | 1/2020 |

OTHER PUBLICATIONS

Israel Duanis, "5 Ways AI is Revolutionizing the Car Rental industry", Auto Rental News, Mar. 11, 2019, 5 pages.

(Continued)

*Primary Examiner* — Susanna M. Diaz
(74) *Attorney, Agent, or Firm* — Brandon Hicks; Eversheds Sutherland (US) LLP

(57) ABSTRACT

The disclosure generally pertains to systems and methods to predict a vehicle preference of a customer of a rental vehicle agency. An example method to do so involves a computer executing a prediction procedure to obtain and evaluate information associated with a customer. The information can include vehicle ownership history and/or monitoring data obtained from vehicles used by the customer (a personal vehicle, a taxi, and/or a ride share service vehicle, for example). The information may be evaluated by the computer to determine a personal profile of the customer. The personal profile can include items such as physical attributes of the customer, family size, driving characteristics, and/or past vehicle ownership. The personal profile of the customer may then be used by the computer to predict a type of vehicle preferred by the customer and to select, from a vehicle fleet, a vehicle that matches the preferred type of vehicle.

20 Claims, 4 Drawing Sheets

(51) Int. Cl.
  *G06Q 30/0645* (2023.01)
  *G06Q 30/0201* (2023.01)
  *G06Q 50/30* (2012.01)
  *G06N 5/04* (2023.01)
  *G07C 5/08* (2006.01)
  *G06Q 10/0631* (2023.01)
  *G06Q 30/0601* (2023.01)

(52) U.S. Cl.
  CPC ..... *G06Q 30/0201* (2013.01); *G06Q 30/0202* (2013.01); *G06Q 30/0645* (2013.01); *G06Q 50/30* (2013.01); *G07C 5/0841* (2013.01); *G06Q 30/0631* (2013.01)

(56) References Cited

U.S. PATENT DOCUMENTS

| | | | |
|---|---|---|---|
| 2018/0050698 A1* | 2/2018 | Polisson | B60W 30/182 |
| 2018/0068355 A1 | 3/2018 | Garry et al. | |
| 2019/0057166 A1* | 2/2019 | Liongosari | B60R 16/037 |
| 2019/0273817 A1* | 9/2019 | Ueno | G08G 1/005 |
| 2019/0279286 A1* | 9/2019 | Tanabe | G06Q 10/02 |
| 2019/0300015 A1* | 10/2019 | Kodera | B60W 50/0098 |
| 2019/0304010 A1* | 10/2019 | Mitsumaki | G06Q 30/0631 |
| 2020/0082287 A1* | 3/2020 | Beaurepaire | G06N 5/047 |
| 2020/0164886 A1* | 5/2020 | Dutta | G06F 21/6227 |
| 2021/0103977 A1* | 4/2021 | Tanimura | G06Q 30/0645 |
| 2021/0166103 A1* | 6/2021 | Jackson | G06N 3/08 |
| 2021/0358025 A1* | 11/2021 | Rosekrans | G07C 5/02 |
| 2022/0055649 A1* | 2/2022 | Isaac | G06F 16/9535 |
| 2022/0058670 A1* | 2/2022 | Harvey | G06Q 50/30 |
| 2022/0207450 A1* | 6/2022 | Francis | G06Q 50/30 |
| 2022/0270176 A1* | 8/2022 | Chintakindi | G06Q 10/0635 |
| 2022/0301043 A1* | 9/2022 | Löthman | G06Q 30/0645 |

OTHER PUBLICATIONS

Rishabh Makrand, Technology With Contributions From Akash Bajpai, "The Power of Knowing How To Delight Your Customers—AI can help unlock new insights", Data Driven Investor (DDI), Biswajit, Apr. 15, 2019, 4 pages.

* cited by examiner

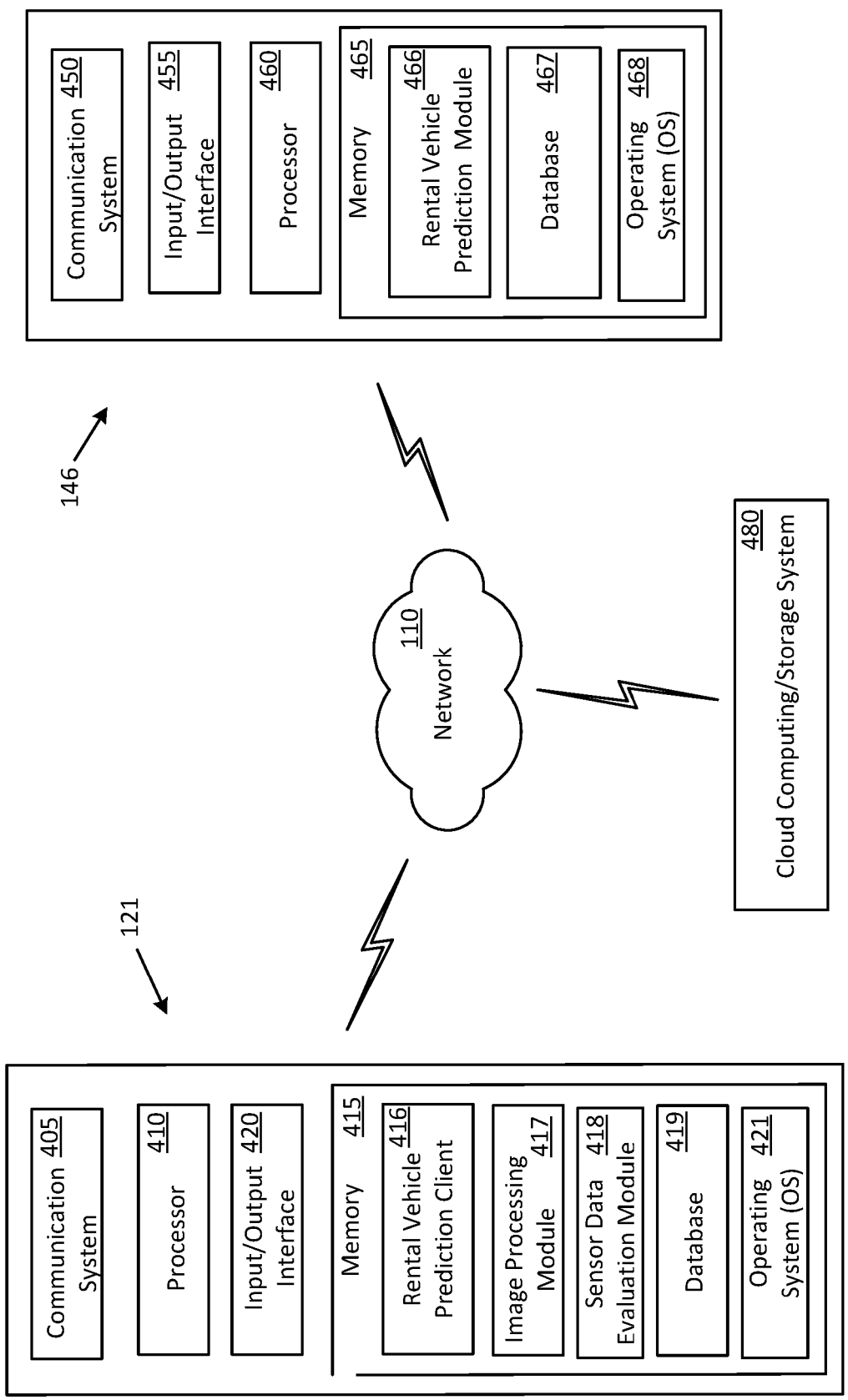

SYSTEMS AND METHODS TO PREDICT RENTAL VEHICLE PREFERENCE OF A CUSTOMER

BACKGROUND

A rental car company typically selects the type of vehicles and the number of vehicles for its vehicle fleet based on factors such as its customer base, volume of business, and location. Often, vehicle purchases and subsequent operations procedures may involve a trial-and-error approach or a best-guess approach. As a result, a rental car company may suffer financial losses if poor decisions are made regarding vehicle purchases and customers become unhappy with the types of vehicles available for rent when needed. For example, a customer desiring to rent a compact car may be unhappy if compelled to rent a more expensive luxury vehicle as a result of the rental car company not having an adequate stock of compact cars, or compelled to go to another rental car company to find an alternative vehicle.

It is therefore desirable to provide a solution that will not only assist a rental car company make decisions about vehicle purchases but also provide better customer service without sacrificing profits.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 shows some example components that may be included in one or more computers of a system that enables a rental vehicle agency to rent a vehicle to a customer based on predicting a vehicle preference of the customer in accordance with an embodiment of the disclosure.

DETAILED DESCRIPTION

Overview

Figure 1:
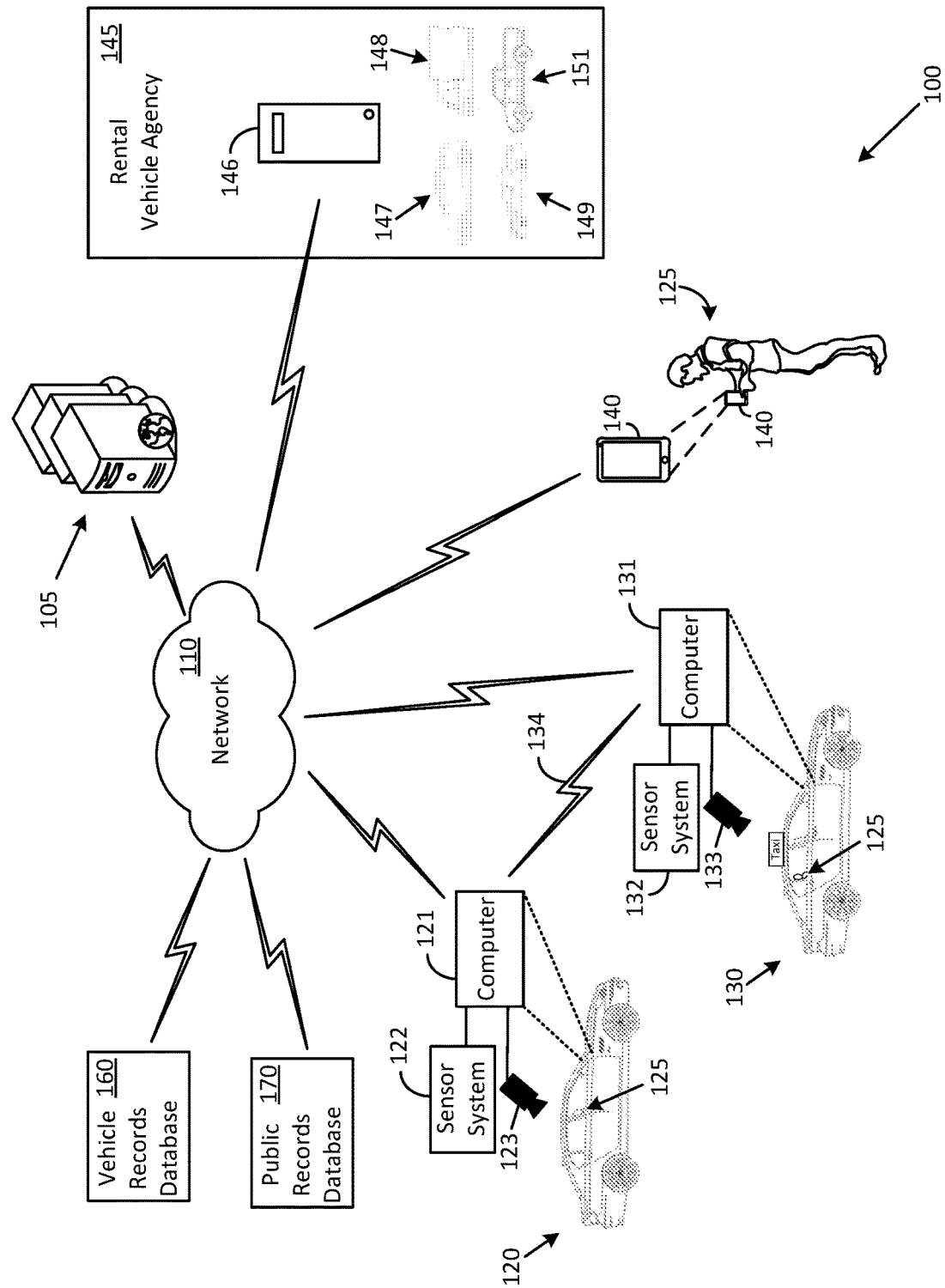
FIG. 1 shows an example system that enables a rental vehicle agency to rent a vehicle to a customer based on predicting a vehicle preference of the customer in accordance with an embodiment of the disclosure.

The disclosure generally pertains to systems and methods to predict a vehicle preference of a customer of a rental vehicle agency. An example method to do so involves a computer executing a prediction procedure that involves obtaining and evaluating information associated with a customer. The information can include vehicle ownership history and/or monitoring data obtained from one or more vehicles used by the customer (a personal vehicle, a taxi, and/or a ride share service vehicle, for example). The information may be evaluated by the computer to determine a personal profile of the customer. The personal profile can include items such as physical attributes of the customer, family size of the customer, driving characteristics of the customer, and/or past vehicle ownership. The personal profile of the customer may then be used by the computer to predict a type of vehicle preferred by the customer and to select, from a vehicle fleet, a vehicle that matches the preferred type of vehicle.

In some cases, such as, for example, when a vehicle that matches the preferred type of vehicle is unavailable, the personal profile of the customer may be used to recommend to the customer an alternative vehicle. The alternative vehicle may be selected based on various criteria such as, for example, to introduce the customer to various features available in the alternative vehicle, to incentivize the customer to rent the alternative vehicle, or to execute an inventory operation (balancing demand and availability of various types of vehicles, for example).

Balancing demand and availability of various types of vehicles can further involve operations such as, for example, evaluating the popularity of certain vehicles and/or lack of popularity of certain other vehicles and using the evaluation information to adjust the number of popular, less popular, and unpopular vehicles included in the vehicle inventory of the rental vehicle agency. Other considerations to predict a vehicle preference of a customer include seasonality or expected weather. Depending on the time of the year and the forecast, vehicle selection may differ. For example, 4×4 may be preferred in snowy conditions or a more sporty vehicle in sunny weather. Preferences can change by destination/climate. Further, known itinerary and the associated vehicle routes can be included to make suggestion modifications. For example, destinations that require driving off road for access would receive a new consideration for vehicle recommendation.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and labels are used herein solely for convenience and such words and labels should be interpreted as referring to various objects and actions that are generally understood in various forms and equivalencies by persons of ordinary skill in the art. For example, the word "vehicle" as used in this disclosure can pertain to any of various types of vehicles, such as, for example, a car, a van, a sports utility vehicle, a truck, an alternative energy vehicle, a driver-operated vehicle, or an autonomous vehicle. A fleet of vehicles may be owned and/or operated by various entities such as, for example, a rental vehicle agency, a taxi service, a ride share service, or a transportation service. The label "rental vehicle" as used herein must be understood to encompass alternative labels such as, for example, "rental car," "rental van," "rental truck," and "rental bus." The label "rental vehicle agency" should be interpreted as encompassing the label "rental car agency" which may be used in popular parlance. The label "monitoring data" as used herein must be understood to encompass various types of information about an individual with respect to a vehicle such as, for example, characteristics of the individual, preferences of the individual, and actions carried out by the individual both inside and outside the vehicle. The label "occupants of a vehicle" as used herein not only refers to humans but also to other entities such as pets, for example. It must be understood that in some scenarios, a customer may select a rental vehicle not only on the basis of human needs but on the needs of pets as well. It should also be understood that the word "example" as used herein is intended to be non-exclusionary and non-limiting in nature. The word indicates one among several examples, and no undue emphasis or preference is being directed to the particular example being described. The label "example implementation" as used herein should be interpreted as a shortened version of the label "example implementation in accordance with the disclosure."

FIG. 1 shows an example system 100 that enables a rental vehicle agency 145 to rent a vehicle to a customer 125 based on predicting a vehicle preference of the customer 125 in accordance with an embodiment of the disclosure. The vehicle preference of the customer 125 may be combined with vehicle preferences of other customers for various other purposes such as, for example, to make decisions regarding vehicle purchases, for vehicle inventory management, and for scheduling.

The example system 100 can include a computer 146 operated by the rental vehicle agency 145, a computer 121 located in a vehicle 120, a computer 131 located in a vehicle 130, a personal communication device 140 operated by the customer 125, a server computer 105, a vehicle records database 160, and a public records database 170. These example components can communicate with each other via a network 110.

The network 110 may include any one network, or a combination of networks, such as, for example, a local area network (LAN), a wide area network (WAN), a telephone network, a cellular network, a cable network, a wireless network, and/or private/public networks such as the Internet. The various components that are communicatively coupled to the network 110 may communicate with each other by using various communication technologies such as, for example, TCP/IP, Bluetooth, cellular, near-field communication (NFC), Wi-Fi, Wi-Fi direct, vehicle-to-vehicle (V2V) communication, and/or vehicle-to-infrastructure (V2I) communication.

The rental vehicle agency 145 may include a fleet of vehicles that can be rented out to various customers such as, for example, the customer 125. In this example scenario, the fleet of vehicles includes a station wagon 147, a delivery van 148, a family sedan 149, and a truck 151. Various other vehicles that may be included in the fleet are not shown. A computer 146, which may be located in an office at a work facility of the rental vehicle agency 145, a head office of the rental vehicle agency 145, or elsewhere, is configured to provide services related to renting the vehicles of the fleet. The services can include predicting a vehicle preference of the customer 125 in accordance with an embodiment of the disclosure.

The computer 146 may be any of various types of computers containing a processor and a memory, such as, for example, a server computer, a client computer, a desktop computer, a laptop computer, a tablet computer, or a handheld device (a smartphone, for example). The computer 146 may be operated by various entities such as, for example, a fleet operator who operates the fleet of vehicles (a dispatcher, a manager, an administrator etc.), a manager, an operations specialist, or an administrator.

Some of the operations performed by such entities can involve communications (emails, texts, information transfer, etc.) between the computer 146 and the personal communication device 140. The personal communication device 140, which may be carried by the customer 125 either when seated inside the vehicle 120 or when standing outside the vehicle 120 (as shown), can be, for example, a smartphone, a tablet computer, a phablet (phone plus tablet computer), or a laptop computer.

In an example embodiment in accordance with disclosure, the vehicle 120 is a personal vehicle that is owned or leased by the customer 125 and used either as a driver or as a passenger, for various purposes. The vehicle 120 may correspond to a type of vehicle (make, model, etc.) based on a personal preference of the customer 125. For example, in one case, the customer 125 may be a type of person who prefers a family sedan that can be used by the customer 125 and/or one or more members of his/her family for various personal and work-related purposes. In another case, the customer 125 may be a type of person who prefers a truck that can be used for various purposes such as transporting materials and traveling off-road during the weekends or on hunting trips.

The computer 121 can be any of various types of computers mounted in the vehicle 120. In one example implementation, the computer 121 can be a part of a vehicle computer and in another example implementation the computer 121 can be a stand-alone computer. Various monitoring devices such as, for example, a sensor system 122 and a camera 123, are provided in the vehicle 120 and configured to propagate monitoring data to the computer 121.

The sensor system 122 can include one or more components such as, for example, a weight sensor that is arranged to produce weight information of one or more individuals present in the vehicle 120, an infrared sensor arranged to detect a presence of one or more occupants present in the vehicle 120, and a microphone arranged to capture voice signals originated by sound sources (including one or more occupants) present in the vehicle 120. The computer 121 may evaluate information provided by the sensor system 122 to obtain information such as, for example, physical attributes of the customer 125 when seated in the vehicle 120 (a weight of the customer 125, for example).

The camera 123 can provide monitoring data to the computer 121 in the form of images, including images of occupants present in the vehicle 120. Exterior facing cameras can also be used to detect occupants entering or exiting the vehicle. The occupants can include the customer 125 as a driver (when the vehicle 120 is a driver-operated vehicle) and as a passenger (when the vehicle 120 is an autonomous vehicle). The computer 121 may evaluate the images to obtain information such as, for example, an age of the customer 125, a physical size of the customer 125, a typical item of wear of the customer 125, and personal habits of the customer 125. The images may also be evaluated to obtain vehicle occupancy information spanning a period of time such as, for example, previous one year or two years. The vehicle occupancy information can include information such as, for example, a number of occupants typically transported in the vehicle 120, physical attributes of the occupants, and behavioral attributes of the occupants.

In some cases, the sensor system 122, the camera 123, and the computer 121 may be a part of an arrangement to collect and share connected vehicle data with various entities such as, for example, the computer 146 of the rental vehicle agency 145, the server computer 105, and the computer 131 provided in the vehicle 130. The connected vehicle data may be evaluated by the computer 146 and/or the server computer 105 in accordance with the disclosure to predict a type of vehicle that may be preferred by the customer 125.

Connected vehicle data exchanges between the computer 121 of the vehicle 120 and the computer 131 of the vehicle 130 may be routed via the network 110 in some cases, and/or directly via vehicle-to-vehicle (V2V) communications (via a wireless link 134) in some other cases.

In addition to, or in lieu of, obtaining the monitoring data from the computer 121, the computer 146 may obtain information associated with the customer 125 from other sources such as the vehicle records database 160 and the public records database 170.

The vehicle records database 160 may contain data associated with the vehicle 120 and other vehicles. A few examples of data contained in the vehicle records database 160 can include ownership information of the vehicle 120, make and model of the vehicle 120, vehicle occupancy capacity of the vehicle 120, vehicle identification number (VIN) of the vehicle 120, odometer readings of the vehicle 120, accident records pertaining to the vehicle 120, repair records of the vehicle 120, and address of owner of the vehicle 120. Data obtained from the vehicle records database 160 may be evaluated by the computer 146, independently or in combination with other data, to predict a type of vehicle preferred by the customer 125 in accordance with the disclosure.

The public records database 170 may contain information associated with the customer 125 and other people associated with the customer 125 such as, for example, family members of the customer 125. A few examples of data contained in the public records database 170 can include a name of the customer 125, current and past addresses of the customer 125, age of the customer 125, citizenship information of the customer 125, and health records of the customer 125. The public records database 170 can also contain information (names, ages, addresses, etc.) of the family members of the customer 125. Data obtained from the public records database 170 may be evaluated by the computer 146, independently or in combination with other data, to predict a type of vehicle preferred by the customer 125 in accordance with the disclosure.

Another source of information associated with the customer 125 is the computer 131 located in the vehicle 130 that may be used by the customer 125 on a pay-per-use basis. The vehicle 130 can be, for example, a taxi, a limousine, a ride share vehicle, a rental vehicle (van, truck, etc.), or an autonomous vehicle available for hire.

Various monitoring devices (such as, for example, a camera 133 and a sensor system 132) that are provided in the vehicle 130 are configured to propagate monitoring data to the computer 131 in a manner similar to that described above with respect to the camera 123, the sensor system 122, and the computer 121.

The monitoring data, which provides information about the customer 125 when riding in the vehicle 130, may be made available to the computer 146 of the rental vehicle agency 145. The computer 146 may use the monitoring data, independently or in combination with other data (such as, for example, obtained from the vehicle records database 160 and/or from other sources) to predict a type of vehicle preferred by the customer 125 in accordance with the disclosure. In an example scenario, the customer 125 may use the vehicle 130 to travel to work on a daily basis, thereby providing to the computer 146, an indication that the customer 125 prefers to rent a vehicle rather than own one.

In another example scenario, the customer 125 may use the vehicle 130 to travel to an airport (on a regular or an occasional basis) thereby providing to the computer 146, an indication that the customer 125 prefers to rent a vehicle of a certain size so as to accommodate transport of a number of members of his/her family and/or an amount of luggage.

In an example embodiment in accordance with the disclosure, information associated with the customer 125 (such as, for example, monitoring data, connected vehicle data, vehicle records data, and public records data) is evaluated by the computer 146 of the rental vehicle agency 145 to determine a personal profile of the customer 125. The computer 146 may then predict a type of vehicle preferred by the customer 125 based on the personal profile of the customer 125.

In another example embodiment in accordance with the disclosure, information associated with the customer 125 (such as, for example, monitoring data, connected vehicle data, vehicle records data, and public records data) is evaluated by the server computer 105 to determine a personal profile of the customer 125. The server computer 105 may then predict a type of vehicle preferred by the customer 125 based on the personal profile of the customer 125. The server computer 105 may convey the results of the evaluation and/or prediction to the computer 146 of the rental vehicle agency 145.

In yet another example embodiment in accordance with the disclosure, information associated with the customer 125 (such as, for example, monitoring data, connected vehicle data, vehicle records data, and public records data) is evaluated by the personal communication device 140 to determine a personal profile of the customer 125. The personal communication device 140 may then predict a type of vehicle preferred by the customer 125 based on the personal profile of the customer 125. The personal communication device 140 may convey the results of the evaluation and/or prediction to the computer 146 of the rental vehicle agency 145.

Figure 2:
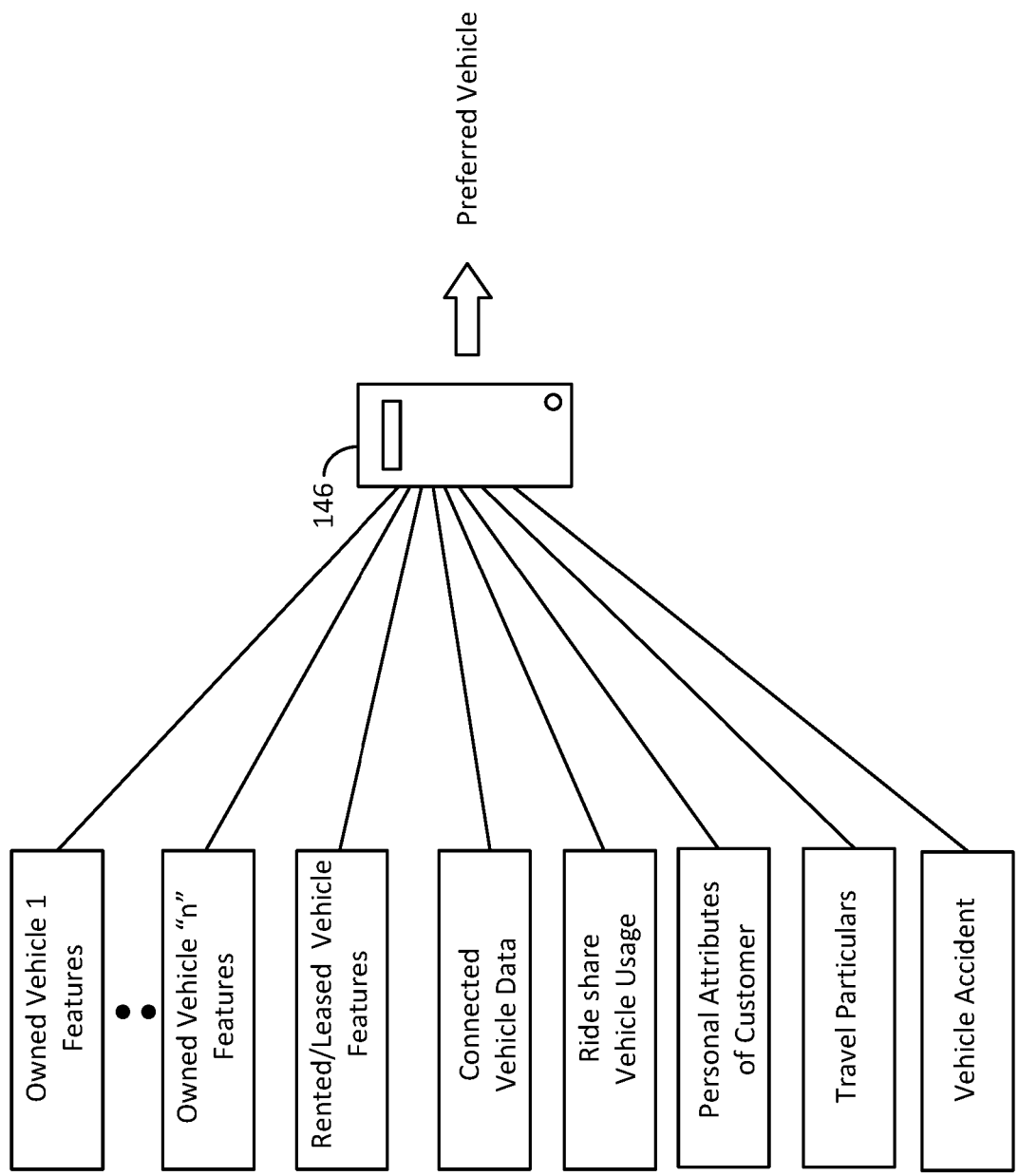
FIG. 2 shows some example input information that may be provided to a computer configured to predict a vehicle preference of a customer of a rental vehicle agency in accordance with an embodiment of the disclosure.

FIG. 2 shows some example input information that may be provided to the computer 146 that is configured to predict a vehicle preference of the customer 125 in accordance with an embodiment of the disclosure. In other embodiments, the computer 146 may be replaced by other devices such as, for example, the server computer 105 or the personal communication device 140.

A first type of example input information pertains to features of vehicles that the customer 125 may currently own or may have owned previously. For example, the customer may currently own the vehicle 120 and may have owned several other vehicles in the past. Information about these vehicles may be obtained from various sources such as, for example, from the vehicle records database 160.

In an example scenario, the vehicle 120 that is currently owned by the customer 125 is a family sedan having features such as a five-person seating capacity, a six-cylinder engine, and a trunk space that accommodates four medium sized suitcases. The previously owned vehicles of the customer 125 may have substantially similar features in some cases and slightly different features in some other cases. The previously owned vehicles may for example, have different seating capacities corresponding to changes in a family size of the customer 125. The computer 146 may evaluate the vehicle-related information individually or in combination with other information, and determine that there is a high probability that the customer 125 will prefer to rent a family sedan with a seating capacity that is equal to, or greater than five, an engine having six or more cylinders, and a trunk space that will accommodate at least four suitcases.

In another example scenario, the vehicle 120 that is currently owned by the customer 125 is a sports vehicle having features such as a two-person seating capacity, an eight-cylinder racing engine, and a trunk space that only accommodates a small carry-on. The previously owned vehicles of the customer 125 may be similar in terms of features because the customer 125 has remained single. The computer 146 may evaluate this information and determine that there is a high probability that the customer 125 will prefer to rent a small vehicle with a very powerful engine.

A second type of example input information that is illustrated in FIG. 2 pertains to features of vehicles that the customer 125 may have rented or leased in the past. Information about these vehicles may be obtained from various sources such as, for example, from historical records of the rental vehicle agency 145 and/or other vehicle rental/leasing agencies. The computer 146 may evaluate this information and identify a type of vehicle that the customer 125 may prefer to rent. As a part of the evaluation, the computer 146 may also evaluate information about the vehicles currently owned or previously owned by the customer 125 in order to determine a probability that the customer 125 prefers to rent/lease a vehicle rather than own a vehicle.

A third type of example input information that is illustrated in FIG. 2 pertains to connected vehicle data of a vehicle associated with the customer 125. Some examples of information that may be derived by the computer 146 from connected vehicle data can include driving characteristics of the customer 125 (aggressive driver, careful driver, prefers not to drive, etc.) and vehicle characteristics (operating features, maintenance features, current condition, etc.). The computer 146 may evaluate the connected vehicle data (individually or in combination with other data) and identify a type of vehicle that the customer 125 may prefer to rent.

A fourth type of example input information that is illustrated in FIG. 2 pertains to ride share vehicle usage by the customer 125. Information about ride share vehicles used by the customer 125 may be obtained from various sources such as, for example, from historical records stored by various ride share companies such as Uber® or Lyft® and/or from the public records database 170. The computer 146 may evaluate this information and identify a type of vehicle that the customer 125 may prefer to rent. As a part of the evaluation, the computer 146 may also evaluate statistical information about ride share usage (for example, how often used, when used, and/or purpose of use) in order to determine a probability that the customer 125 prefers to use a ride share vehicle rather than rent and/or own a vehicle.

A fifth type of example input information that is illustrated in FIG. 2 pertains to personal attributes of the customer 125. A few example personal attributes can include physical attributes of the customer 125 (height, weight vision, disabilities, etc.), family details (number of family members living with the customer 125, ages of family members, vehicle requirement of family members, etc.), residence particulars (address, access to highways, commute distances, etc.), financial standing (credit history, credit rating, etc.), and work particulars (employer, location of workplace, commute distance from residence, number of trips in vehicle per week, etc.). The computer 146 may evaluate the personal attributes of the customer 125 (individually or in combination with other data) and identify a type of vehicle that the customer 125 may prefer to rent.

A sixth type of example input information that is illustrated in FIG. 2 pertains to travel particulars of the customer 125. The computer 146 may evaluate vacation travel in view of places where the customer 125 has resided in order to identify a type of vehicle that the customer 125 may prefer to use during travel. In an example case, the customer 125 may have several children and is accustomed to living in an area having a cold climate. The customer 125 may prefer to rent a more luxurious and flashier vehicle when travelling to a location having a warmer climate. In another example case, the customer 125 may be unaccustomed to driving on snow covered roads and may prefer to rent a large, heavy vehicle with four-wheel drive when traveling to snowy locations.

In yet another example case, the computer 146 may access a calendar of the customer 125 in order to identify and to evaluate travel plans of the customer 125. The calendar may indicate, for example, that the customer 125 is expected to travel from a city where the customer 125 currently resides to another city that the customer 125 has visited in the past and has used a rental vehicle. The computer 146 can conclude that there is a high probability that the customer 125 will be in need of a rental vehicle when visiting the other city per the travel plan.

In an example embodiment, the computer 146 may use natural language processing techniques to parse calendar events into relevant categories. For example, if the travel plans indicate a family vacation, the computer 146 can determine that the customer 125 may prefer a larger vehicle that can accommodate a family. On the other hand, if the travel plans indicate a work trip, the computer 146 can determine that the customer 125 may prefer a smaller vehicle.

A seventh type of example input information that is illustrated in FIG. 2 pertains to accidents that may have taken place, or have recently occurred, in which the customer 125 was involved. The computer 146 may access sources such as police reports and/or insurance reports to determine when, where, and what extent of damage, may have occurred to a vehicle associated with the customer 125 and involved in the accident(s). Details about the vehicle may also be obtained from the vehicle records database 160. The computer 146 may evaluate the information to identify a type of vehicle that the customer 125 may prefer to rent. The computer 146 may also determine an urgency for delivery of a rental vehicle to the customer 125 (as soon as possible because the customer had the accident during a family vacation trip, in a week because the damaged vehicle is being repaired, etc.).

Figure 3:
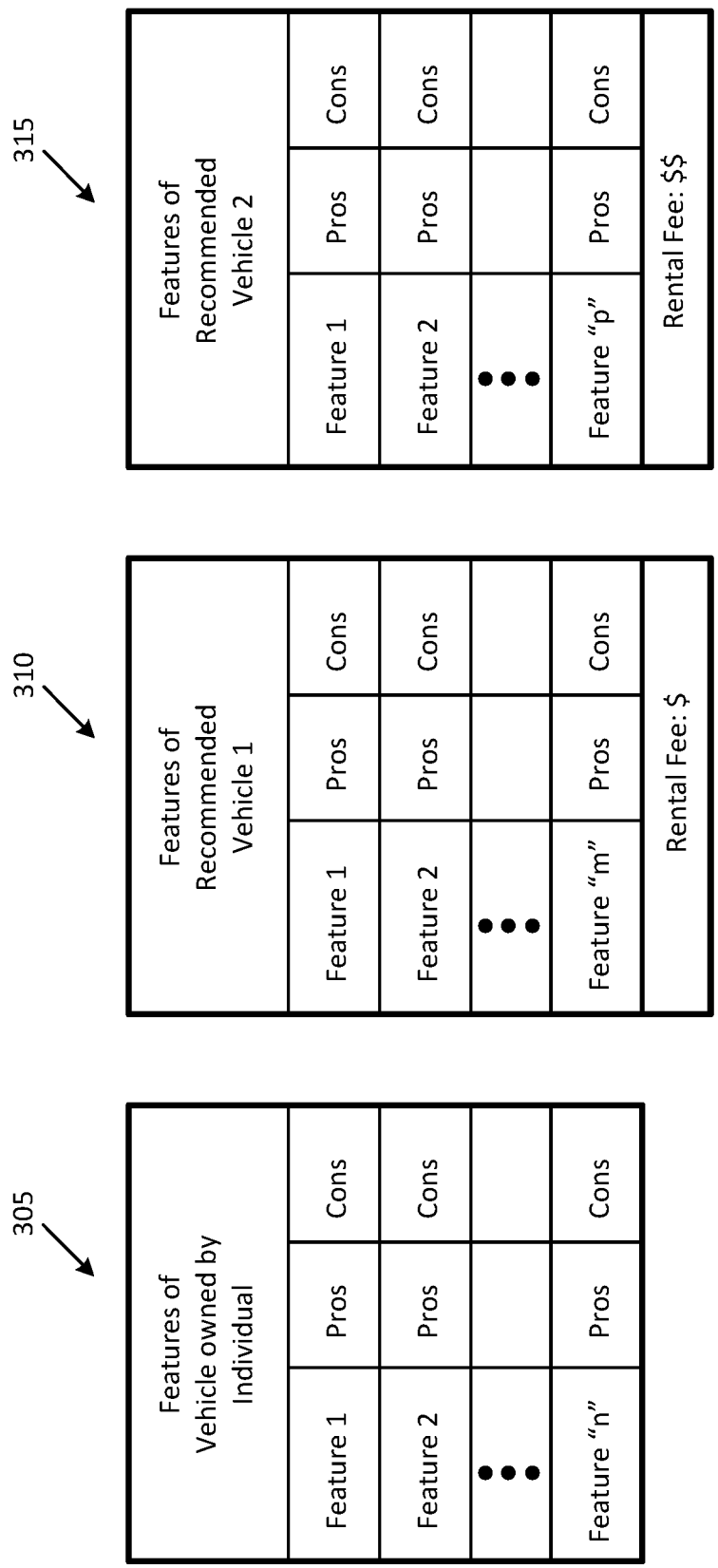
FIG. 3 shows an example format to provide a comparison between vehicles to assist a customer select a rental vehicle in accordance with an embodiment of the disclosure.

FIG. 3 shows an example format of a comparative list that allows comparison between vehicles to assist the customer 125 select a rental vehicle in accordance with an embodiment of the disclosure. In this example, the customer 125 may make a determination to rent one of two vehicles based on comparing features of a vehicle associated with the customer 125 (for example, the vehicle 120) against features of a first rental vehicle and a second rental vehicle. The comparison can be extended to more than two rental vehicles in other scenarios.

Table 305 illustrates a list of features of the vehicle 120 that may be currently owned, currently leased, previously owned, or previously leased by the customer 125. Some example features can include items such as vehicle type (manual drive, automatic drive, autonomous vehicle including Level information), a vehicle propulsion system (internal combustion engine, electric, hybrid-electric, plug-in hybrid, hydrogen, etc.), current odometer reading, odometer reading when last driven by the customer 125, physical condition of vehicle, maintenance history, cabin size, seating capacity, luggage capacity, towing capacity, and level of automation.

Pros and cons of some or all of the listed features may be listed so as to provide to the customer 125, a deeper understanding of the features. An example pro for an eight-cylinder internal combustion engine may be power available for proposes such as, for example, speed and/or towing capacity. An example con for the same eight-cylinder internal combustion engine may be poor fuel efficiency and fuel cost. In some cases, the pros and cons list may be tailored to offer a comparison between a vehicle such as, for example, a vehicle having the eight-cylinder internal combustion engine and a vehicle currently owned by the customer 125. The comparison may incentivize the customer 125 to rent the vehicle having the eight-cylinder internal combustion engine for purposes of testing and investigating various features such as, for example, towing a boat, that the customer 125 may have in mind.

Table 310 illustrates a list of features, along with pros and cons, of a first rental vehicle available for rent from the rental vehicle agency 145. In an example scenario, the computer 146 may have selected the first rental vehicle based on predicting a type of vehicle preferred by the customer 125. The list of features of the first rental vehicle may include some or all of the features of the vehicle 120 that are listed in table 305, as well as any additional features that may be relevant to assist the customer 125 distinguish the first rental vehicle over the vehicle 120.

Table 315 illustrates a list of features along with pros and cons, of a second rental vehicle available for rent from the rental vehicle agency 145. In an example scenario, the computer 146 may also have selected the second rental vehicle based on predicting a type of vehicle that may be preferred by the customer 125. The list of features of the second rental vehicle may include some or all of the features of the vehicle 120 that are listed in table 305, some or all of the features of the first rental vehicle that are listed in table 310, as well as any additional features that may be relevant to assist the customer 125 distinguish the second rental vehicle over the first rental vehicle and/or the vehicle 120.

In some cases, a rental fee applicable to each of the first rental vehicle and the second rental vehicle may also be provided in order to assist the customer 125 include pricing when comparing the first rental and the second rental vehicle to the vehicle 120.

The features listed for the three vehicles may be selected not only to highlight similarities between vehicles but to also indicate differences. For example, each of the first rental vehicle and the vehicle 120 may be an electric vehicle. However, additional features of the first rental vehicle may provide an indication to the customer 125 that the charging requirements for the first rental vehicle are different than those for the vehicle 120 (longer charging time, shorter charging time, higher capacity battery storage, etc.). Additional features may also provide an indication to the customer 125 an indication that the second electric vehicle is a hybrid electric vehicle whereas the vehicle 120 is an all-electric vehicle. The customer 125 may evaluate trade-offs between cost, convenience, and practicality with respect to the three vehicles based on such indications.

FIG. 4 shows some example components that may be included in one or more computers of the system 100 in accordance with an embodiment of the disclosure. In this example implementation, the computer 146 operated by the rental vehicle agency 145 is configured to execute a prediction procedure to predict a vehicle preference of the customer 125 in accordance with an embodiment of the disclosure.

The computer 121 is an example client device that provides information to the computer 146. One or more other computers such as, for example, the computer 131 in the vehicle 130 (a taxi or ride-share vehicle, for example) and/or the server computer 105 may be similarly configured to operate as client devices in this example implementation.

The computer 146 may include various components such as, for example, a communication system 450, an input/output interface 455, a processor 460 and a memory 465. The communication system 450 can include wireless communication devices that allow the computer 146 to communicate with other devices through the network 110. The input/output interface 455 can include circuitry that allows the computer 146 to receive data from various sources such as, for example, the computer 121, the computer 131, the vehicle records database 160, the public records database 170, the personal communication device 140 of the customer 125, and/or a cloud computing/storage system 480. Some examples of information contained in the received data are described above with respect to FIG. 2.

The memory 465, which is one example of a non-transitory computer-readable medium, may be used to store an operating system (OS) 468, a database 467, and various code modules such as, for example, a rental vehicle prediction module 466. The code modules are provided in the form of computer-executable instructions that can be executed by the processor 460 for performing various operations in accordance with the disclosure.

The rental vehicle prediction module 466 may include software that may be installed in the computer 146 or downloaded into the computer 146 in the form of a software application. The software can include one or more algorithms such as, for example, a prediction algorithm and a probability estimation algorithm, and use a machine learning model (such as a neural network, random forest, or gradient boosting machine based on decision trees) to predict a vehicle preference of the customer 125 in accordance with an embodiment of the disclosure.

The database 467 may be used to store information to the customer 125. Data not available in the database 467 may be fetched by the processor 460 from sources such as, for example, the computer 121, the computer 131, the vehicle records database 160, the public records database 170, the personal communication device 140 of the customer 125, and/or the cloud computing/storage system 480.

In an example implementation, the prediction procedure executed by the processor 460 may be directed not only to identify one or more vehicles that may be preferred by the customer 125 but may be directed at eliminating vehicles that may not be desirable to the customer 125. For example, the prediction procedure may process information that indicates that the vehicle 120 owned by the customer 125 is an electric vehicle and various vehicles owned by the customer 125 in the past were electric vehicles. The prediction procedure may use this information to eliminate vehicles having internal combustion engines, particularly large gas-guzzlers.

The computer 121, which is located in the vehicle 120 and configured as a client device that provides information to the computer 146, may include various components such as, for example, a communication system 405, an input/output interface 420, a processor 410 and a memory 415. The communication system 405 can include wireless communication devices that allow the computer 121 to communicate with other devices through the network 110.

The input/output interface 420 can include circuitry that allows the computer 121 to receive data from various sources such as, for example, the sensor system 122 and the camera 123. The memory 415, which is another example of a non-transitory computer-readable medium, may be used to store an operating system (OS) 421, a database 419, and various code modules such as, for example, a rental vehicle prediction client 416, an image processing module 417, and a sensor data evaluation module 418. The code modules are provided in the form of computer-executable instructions that can be executed by the processor 410 for performing various operations in accordance with the disclosure.

The rental vehicle prediction client 416 may include software that may be installed in the computer 121 or downloaded into the computer 121 in the form of a software application. The software can be executed by the processor 410 to perform various operations such as, for example, to accumulate information about the customer 125 and/or to obtain connected vehicle data. The accumulated information about the customer 125 may be forwarded to the computer 146 of the rental vehicle agency 145. The connected vehicle data may be propagated not only to the computer 146 but may be also propagated to other devices such as, for example, the computer 131 of the vehicle 130 and the vehicle records database 160.

Information about the customer 125 may be accumulated by executing the sensor data evaluation module 418 to evaluate data received from the sensor system 122 and/or by executing the image processing module 417 to process images received from the camera 123.

Connected vehicle data may be obtained by the computer 121 from various sensors and data collection components installed in the vehicle 120.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such labels or phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 415 provided in the computer 121 Of the vehicle 120 or in the memory 465 of the computer 146, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
executing a prediction procedure to identify a rental vehicle to offer to a customer of a vehicle rental agency, the prediction procedure comprising:
providing a monitoring system of a first vehicle, the monitoring system comprising a sensor system and at least one camera disposed in or on the first vehicle, wherein the sensor system comprises an infrared sensor, a weight sensor, and a microphone, wherein the first vehicle is a personal vehicle owned or leased by the customer,
generating image data with the at least one camera of the first vehicle indicative of at least one physical or behavioral attribute of one or more occupants of the first vehicle, the one or more occupants comprising the customer,
generating presence data corresponding to a presence of the one or more occupants within the first vehicle with the infrared sensor of the first vehicle,
generating weight data associated with the one or more occupants with the weight sensor of the first vehicle,
generating voice data of the one or more occupants with the microphone of the first vehicle,
evaluating each of the image data, the presence data, the weight data, and the voice data with a computer of the first vehicle to obtain monitoring data,
determining a personal profile of the customer with the monitoring data using the computer;
predicting, based on the personal profile, a type of vehicle preferred by the customer;
selecting a second vehicle in a fleet of rental vehicles based on the type of vehicle preferred by the customer, the second vehicle not matching the first vehicle; and
designating the second vehicle as the rental vehicle to be offered to the customer.

2. The method of claim 1, wherein determining the personal profile of the customer comprises evaluating the monitoring data to determine a physical attribute of the customer, a family size of the customer, a driving characteristic of the customer, and/or a typical number of occupants transported in the first vehicle over a period of time.

3. The method of claim 1, wherein the prediction procedure further comprises:
obtaining a vehicle ownership history of the customer;
evaluating a third vehicle that is included in the vehicle ownership history to identify a feature of the third vehicle; and
confirming the type of vehicle preferred by the customer based on the feature of the third vehicle.

4. The method of claim 3, wherein the feature of the third vehicle is one of a make, a model, a vehicle propulsion system, a seating capacity, a luggage capacity, a vehicle size, and/or a level of automation.

5. The method of claim 1, further comprising:
identifying a first set of features of the second vehicle that is designated as the rental vehicle;
obtaining a vehicle ownership history of the customer;
identifying a second set of features of a third vehicle that is included in the vehicle ownership history of the customer;

preparing a comparison statement based on comparing the second set of features of the third vehicle to the first set of features of the second vehicle; and providing, to the customer, the comparison statement to assist the customer in making a determination to rent the second vehicle.

6. The method of claim 1, wherein the prediction procedure further comprises:

confirming the type of vehicle preferred by the customer based on a feature of the personal vehicle.

7. The method of claim 1, wherein the method further comprises:

selecting a third vehicle in the fleet of rental vehicles, based on a non-availability of the type of vehicle preferred by the customer;

preparing a comparison statement based on comparing a first set of features of the second vehicle and a second set of features of the personal vehicle of the customer; and providing, to the customer, the comparison statement to assist the customer in making a determination to rent the second vehicle.

8. The method of claim 1, wherein the first vehicle is owned by the customer.

9. A method comprising:

executing, by a first computer of a first vehicle, a prediction procedure to identify a rental vehicle to offer to a customer of a vehicle rental agency, the prediction procedure comprising:

providing a monitoring system of the first vehicle, the monitoring system comprising a sensor system and at least one camera disposed in or on the first vehicle, wherein the sensor system comprises an infrared sensor, a weight sensor, and a microphone, wherein the first vehicle is a personal vehicle owned or leased by the customer, generating image data with the at least one camera of the first vehicle indicative of at least one physical or behavioral attribute of one or more occupants of the first vehicle, the one or more occupants comprising the customer, generating presence data corresponding to a presence of the one or more occupants within the first vehicle with the infrared sensor of the first vehicle, generating weight data associated with the one or more occupants with the weight sensor of the first vehicle, generating voice data of the one or more occupants with the microphone of the first vehicle, and evaluating each of the image data, the presence data, the weight data, and the voice data with the first computer to obtain monitoring data, extracting, from the monitoring data, a personal profile of the customer;

obtaining a vehicle ownership history of the customer;

evaluating the vehicle ownership history of the customer to predict a type of vehicle preferred by the customer; and confirming the type of vehicle preferred by the customer based on the personal profile of the customer;

selecting, by the first computer, a second vehicle in a fleet of rental vehicles based on the type of vehicle preferred by the customer, the second vehicle not matching the first vehicle; and designating, by the first computer, the second vehicle as the rental vehicle to be offered to the customer.

10. The method of claim 9, wherein selecting, by the first computer, the second vehicle in the fleet of rental vehicles is based on an availability of the type of vehicle preferred by the customer and the personal profile of the customer.

11. The method of claim 9, further comprising obtaining connected vehicle data from a server computer that is configured to obtain the connected vehicle data from the first vehicle.

12. The method of claim 9, wherein obtaining information associated with the customer further comprises obtaining connected vehicle data from the first vehicle, the connected vehicle data providing information of a performance characteristic of the personal vehicle, and further wherein selecting, by the first computer, the second vehicle in the fleet of rental vehicles is based on an availability of the type of vehicle preferred by the customer, the personal profile of the customer, and the performance characteristic of the personal vehicle.

13. The method of claim 12, further comprises:

selecting, by the first computer, a third vehicle in the fleet of rental vehicles based on a non-availability of the type of vehicle preferred by the customer;

preparing, by the first computer, a comparative list of features of the third vehicle and the personal vehicle of the customer; and providing, by the first computer to the customer, the comparative list of features and an offer to rent the third vehicle.

14. The method of claim 13, wherein the comparative list of features comprises a make, a model, a vehicle propulsion system, a seating capacity, a luggage capacity, a vehicle size, and/or a level of automation of the third vehicle and the personal vehicle.

15. A computer comprising:

a memory that stores computer-executable instructions; and a processor configured to access the memory and execute the computer-executable instructions to perform operations comprising:

executing a prediction procedure to identify a rental vehicle to offer to a customer of a vehicle rental agency, the prediction procedure comprising:

providing a monitoring system of a first vehicle comprising a sensor system and at least one camera disposed in or on the first vehicle, wherein the sensor system comprises an infrared sensor, a weight sensor, and a microphone, wherein the first vehicle is a personal vehicle owned or leased by the customer, generating image data with the at least one camera of the first vehicle indicative of at least one physical or behavioral attribute of one or more occupants of the first vehicle, the one or more occupants comprising the customer, generating presence data corresponding to a presence of the one or more occupants within the first vehicle with the infrared sensor of the first vehicle, generating weight data associated with the one or more occupants with the weight sensor of the first vehicle, generating voice data of the one or more occupants with the microphone of the first vehicle, evaluating each of the image data, the presence data, the weight data, and the voice data with the processor to obtain monitoring data, determining a personal profile of the customer with the monitoring data using the processor; and predicting, based on the personal profile, a type of vehicle preferred by the customer;

selecting a second vehicle in a fleet of rental vehicles based on the type of vehicle preferred by the customer, the second vehicle not matching the first vehicle; and designating the second vehicle as the rental vehicle to be offered to the customer.

16. The computer of claim 15, further comprising evaluating the monitoring data to determine a physical attribute of the customer, a family size of the customer, a driving characteristic of the customer, and/or a typical number of occupants transported in the first vehicle over a period of time.

17. The computer of claim 15, wherein the prediction procedure further comprises:

obtaining a vehicle ownership history of the customer;

evaluating a third vehicle that is included in the vehicle ownership history to identify a feature of the third vehicle; and confirming the type of vehicle preferred by the customer based on the feature of the third vehicle.

18. The computer of claim 15, wherein the processor is configured to access the memory and execute additional computer-executable instructions to perform operations comprising:

identifying a first set of features of the second vehicle that is designated as the rental vehicle;

obtaining a vehicle ownership history of the customer;

identifying a second set of features of a third vehicle that is included in the vehicle ownership history of the customer;

preparing a comparison statement based on comparing the second set of features of the third vehicle to the first set of features of the second vehicle; and providing, to the customer, the comparison statement to assist the customer in making a determination to rent the second vehicle.

19. The computer of claim 15, wherein the prediction procedure further comprises:

confirming the type of vehicle preferred by the customer based on a feature of the one of thpersonal vehicle.

20. The computer of claim 15, wherein the processor is configured to access the memory and execute additional computer-executable instructions to perform operations comprising:

selecting a third vehicle in the fleet of rental vehicles based on a non-availability of the type of vehicle preferred by the customer;

preparing a comparison statement based on comparing a first set of features of the second vehicle and a second set of features of the personal vehicle of the customer; and providing, to the customer, the comparison statement to assist the customer in making a determination to rent the second vehicle.

* * * * *